United States Patent
Aga et al.

(10) Patent No.: US 11,847,055 B2
(45) Date of Patent: Dec. 19, 2023

(54) APPROACH FOR REDUCING SIDE EFFECTS OF COMPUTATION OFFLOAD TO MEMORY

(71) Applicant: Advanced Micro Devices, Inc., Santa Clara, CA (US)

(72) Inventors: Shaizeen Aga, Santa Clara, CA (US); Nuwan Jayasena, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/364,854

(22) Filed: Jun. 30, 2021

(65) Prior Publication Data

US 2023/0004491 A1   Jan. 5, 2023

(51) Int. Cl.
*G06F 12/00*   (2006.01)
*G06F 12/084*  (2016.01)
*G06F 12/02*   (2006.01)
*G06F 12/0862* (2016.01)
*G06F 12/0811* (2016.01)

(52) U.S. Cl.
CPC ........ *G06F 12/084* (2013.01); *G06F 12/0238* (2013.01); *G06F 12/0811* (2013.01); *G06F 12/0862* (2013.01)

(58) Field of Classification Search
CPC .............. G06F 12/084; G06F 12/0238; G06F 12/0811; G06F 12/0862; G06F 2212/602; G06F 2212/6022; G06F 2212/6024; G06F 2212/6026; G06F 2212/6028
See application file for complete search history.

(56) References Cited

U.S. PATENT DOCUMENTS

| | | | |
|---|---|---|---|
| 5,737,747 A | 4/1998 | Vishlitzky et al. | |
| 2005/0071571 A1* | 3/2005 | Luick | G06F 12/0862 711/138 |
| 2013/0159679 A1 | 6/2013 | McCormick, Jr. et al. | |

(Continued)

OTHER PUBLICATIONS

Xu et al., [PIMCH: Cooperative Memory Prefetching in Processing-In-Memory Architecture], 2018, IEEE, pp. 209-214 (Year: 2018).*

(Continued)

*Primary Examiner* — Shawn X Gu
(74) *Attorney, Agent, or Firm* — Hickman Becker Bingham Ledesma LLP (57) ABSTRACT

A technical solution to the technical problem of how to reduce the undesirable side effects of offloading computations to memory uses read hints to preload results of memory-side processing into a processor-side cache. A cache controller, in response to identifying a read hint in a memory-side processing instruction, causes results of the memory-side processing to be preloaded into a processor-side cache. Implementations include, without limitation, enabling or disabling the preloading based upon cache thrashing levels, preloading results, or portions of results, of memory-side processing to particular destination caches, preloading results based upon priority and/or degree of confidence, and/or during periods of low data bus and/or command bus utilization, last stores considerations, and enforcing an ordering constraint to ensure that preloading occurs after memory-side processing results are complete.

20 Claims, 3 Drawing Sheets

(56) References Cited

U.S. PATENT DOCUMENTS

| | | | |
|---|---|---|---|
| 2014/0344553 A1* | 11/2014 | Hughes | G06F 9/345 |
| | | | 712/208 |
| 2017/0060588 A1 | 3/2017 | Choi | |
| 2017/0123987 A1 | 5/2017 | Cheng et al. | |
| 2017/0147496 A1* | 5/2017 | Sasanka | G06F 9/383 |
| 2017/0286118 A1* | 10/2017 | Coleman | G06F 9/30043 |
| 2018/0107598 A1 | 4/2018 | Prodromou et al. | |

OTHER PUBLICATIONS

International Searching Authority, "Written Opinion", in International Application No. PCT/US2022/032470, dated Sep. 23, 2022, 4 pages.

International Searching Authority, "Search Report", in International Application No. PCT/US2022/032470, dated Sep. 23, 2022, 4 pages.

* cited by examiner

Host-only execution:

Conv (A, w1 -> B)
Scalar-sum (B + C -> D)
Conv (D, w2 -> E)

FIG. 2B

Host + PIM execution:

Conv (A, w1 -> B)
Flush B
Flush D
PIM: Scalar-sum (B + C -> D)
Conv (D, w2 -> E)

FIG. 2C

Host + PIM execution:

Conv (A, w1 -> B)
Flush B
Flush D
PIM+: Scalar-sum (B + C -> D)
Conv (D, w2 -> E)

FIG. 3

| | | | | |
|---|---|---|---|---|
| Head Block → | 0 | 1 | 2 | 3 |
| | 4 | 5 | 6 | 7 |
| | 8 | 9 | 10 | 11 |
| | 12 | 13 | 14 | 15 | ← Tail Block

300

APPROACH FOR REDUCING SIDE EFFECTS OF COMPUTATION OFFLOAD TO MEMORY

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers that allow some computations to be performed locally to memory, such as arithmetic computations. This allows a memory controller to trigger local computations at multiple memory modules in parallel without requiring data movement across the memory module interface, which can greatly improve performance, particularly for data-intensive workloads.

One of the technical problems of offloading computations to memory, for example using PIM technology, is that while it reduces data bus traffic and computational burdens on processors, there can be undesirable side effects. These include increased costs in the form of an increased number of cache flushes and cache misses when processor-side computations need to use the results of PIM-based computations that are stored in memory that would otherwise, at least in some situations, be available in processor-side caches had the PIM-based computations instead been performed by the processor.

Consider the example of a first processor-side computation, followed by a PIM-based computation that uses the results of the first processor-side computation, followed by a second processor-side computation that uses the results of the PIM-based computation. The results of the first processor-side computation must be flushed to memory so that they are available to the PIM elements performing the PIM-based computation. Conversely, the results of the PIM-based computation that are needed for the second processor-side computation are stored in memory, which leads to cache misses. In this example, the costs of the additional cache flush and cache misses reduce or offset the performance benefits of offloading computations to PIM elements.

One technical solution to this problem is to preload the results of PIM-based computations from memory to processor-side caches, for example by launching a prefetch function/kernel in the Graphics Processing Unit (GPU) context or issuing prefetch instructions in the Central Processing Unit (CPU) context. This solution has the disadvantages, however, of incurring increased latency attributable to an additional kernel launch in the GPU context and prefetches in the CPU context, and serialization of the preloading on the critical processor path. There is, therefore, a need for a technical solution to the technical problem of how to reduce the undesirable side effects of offloading computations to memory.

BRIEF DESCRIPTION OF THE DRAWINGS

Implementations are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Cache Architecture
III. Read Hints
   A. Introduction
   B. Using Read Hints to Preload Results of Memory-Side Processing
   C. Refinements and Extensions
      1. Preloading to a Particular Target Cache
      2. Selective Preloading of Memory-Side Computation Results
      3. Priority and Degree of Confidence
      4. Optional Preloading Based Upon Cache Thrashing
      5. Fine-Grained Read Hints and Last Stores Considerations I. Overview A technical solution to the technical problem of how to reduce the undesirable side effects of offloading computations to memory uses read hints to preload results of memory-side processing into a processor-side cache. As used herein and described in more detail hereinafter, the term "read hint" refers to an indication in a memory-side processing instruction that the results generated by the corresponding memory-side processing will be read by a processor. A cache controller, in response to identifying a read hint in a memory-side processing instruction, causes results of the memory-side processing to be preloaded into a processor-side cache.

The technical solution provides the technical benefits of allowing data intensive computations to be offloaded to memory, but with reduced cache misses that would normally be incurred when offloading computations to memory. In addition, the technical solution does not suffer from the disadvantages of prior solutions, namely, increased latency attributable to additional kernel launches in the GPU context and prefetches in the CPU context, and serialization of the preloading on the critical processor path. Implementations include, without limitation, enabling or disabling the preloading based upon cache thrashing levels, preloading results of memory-side processing to particular destination caches, preloading particular portions of memory-side processing results, preloading results based upon priority and/or degree of confidence, preloading results during periods of low data bus and/or command bus utilization, last stores considerations, and enforcing an ordering constraint to ensure that preloading occurs after memory-side processing results are complete.

II. Cache Architecture

Figure 1:
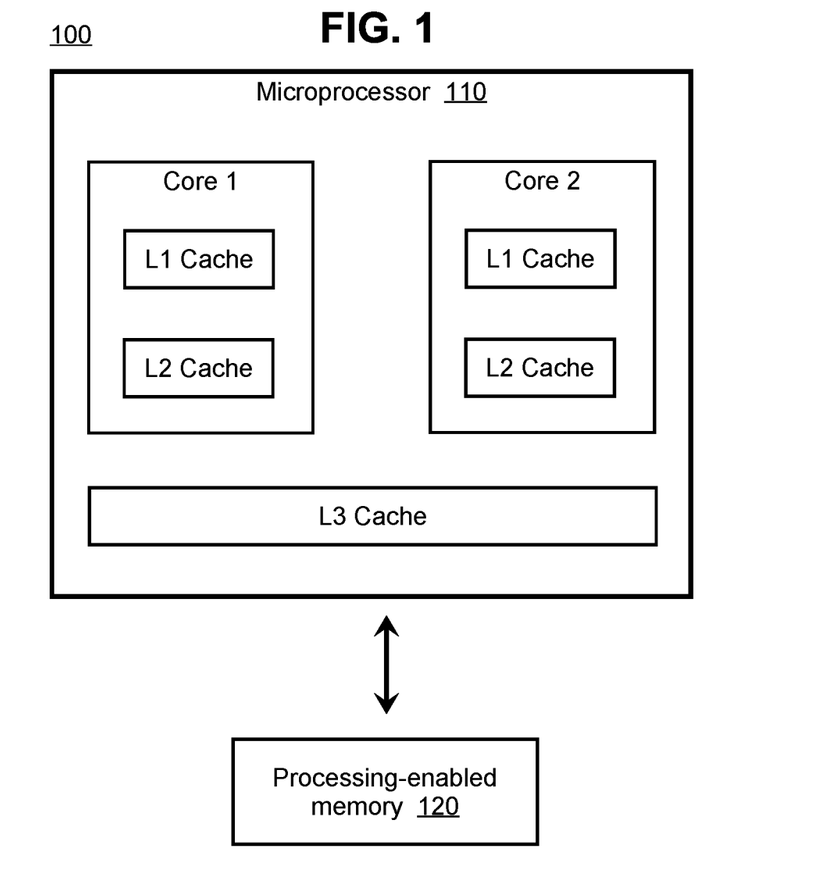
FIG. 1 depicts an example cache architecture that includes a microprocessor and a processing-enabled memory.

FIG. 1 depicts an example cache architecture 100 that includes a microprocessor 110 and a processing-enabled memory 120. The example cache architecture 100 of FIG. 1 is depicted and described in the context of a microprocessor, but implementations are not limited to this context and are applicable to the GPU context. The cache architecture 100 of FIG. 1 can include fewer or additional elements, depending upon a particular implementation.

The microprocessor 110 includes two cores, identified in FIG. 1 as "Core 1" and "Core 2" for purposes of explanation, but implementations are not limited to implementations with two cores and are applicable to implementations with a single core or more than two cores. Each core includes a private level 1 (L1) and level 2 (L2) cache, and the two cores also share a level 3 (L3) cache, which in this example is the last level cache. Each of the caches L1, L2, L3 includes a cache controller that is not depicted in the figures for purposes of explanation. Implementations are not limited to the cache structure depicted in FIG. 1 and are applicable to any type of cache structure including, for example, cache structures with fewer or additional caches of any type. In addition, although multi-core microprocessors are commonly implemented with the same cache structure, i.e., the same type and size of L1 and L2 cache, implementations are not limited to this context and are applicable to cores have different cache structures. The microprocessor 110 can include other elements that are not depicted in the figures or described herein for purposes of explanation, such as a memory controller, an Arithmetic and Logical Unit (ALU), buffers, data, address, control buses, etc., depending upon a particular implementation.

The processing-enabled memory 120 is memory that includes one or more processing elements and, optionally, local storage for performing memory-side processing. One non-limiting example of the processing-enabled memory 120 is one or more Processor-In-Memory (PIM)-enabled Dynamic Random-Access Memory (DRAM) memory modules. Implementations are described hereinafter in the context of PIM-enabled memory for purposes of explanation, but implementations are not limited to this example and are applicable to any type of processing-enabled memory.

III. Read Hints

A. Introduction

Figure 2A:
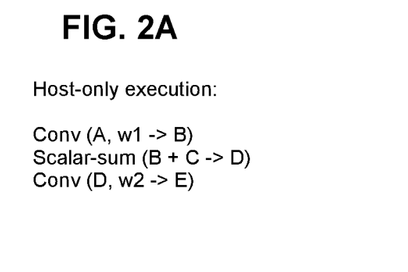
FIG. 2A depicts instructions for performing a set of computations on a host processor.
Figure 2B:
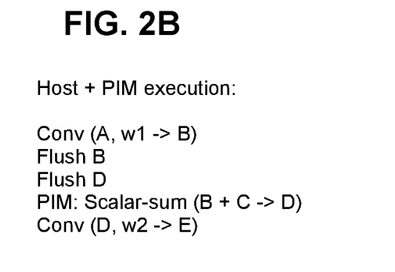
FIG. 2B depicts instructions for performing the same set of calculations as in FIG. 2A, except the scalar sum calculation has been offloaded to memory.
Figure 2C:
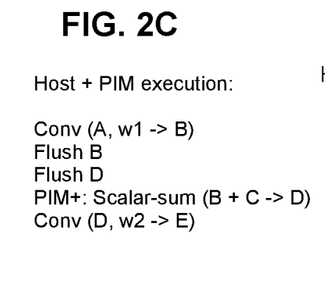
FIG. 2C depicts instructions for performing the same set of calculations as in FIG. 2B with the scalar sum calculation offloaded to memory, except a read hint is used to reduce cache misses incurred by offloading the scalar sum calculation to memory.

FIGS. 2A-2C depict example pseudo code in which read hints are used to reduce the side effects of offloading computations to memory. FIG. 2A depicts instructions for performing a set of computations on a host processor. The computations include a first convolution calculation ("Cony"), a scalar sum calculation ("Scalar-sum"), and a second convolution calculation. These particular calculations are used for explanation purposes and implementations are applicable to any type and any number of functions or calculations.

As depicted in FIG. 2A, the results of the first convolution calculation are stored in array B and used in the scalar sum calculation. Similarly, the results of the scalar sum calculation are stored in array D and used in the second convolution calculation. The results of the second convolution calculation are stored in array E. It is normally expected, although not guaranteed, that at least a portion of arrays B, D, and E are stored in a processor-side cache, such as L1, L2 and/or L3 caches of FIG. 1. The portions of these arrays that are stored in cache depend upon a variety of factors, such as the size of arrays B, D, and E, the size of the available cache, the particular eviction algorithm used, e.g., least recently used, least frequently used, first-in-first-out, etc. In this example it is presumed that at least a portion of arrays B and D are stored in processor-side cache and that the scalar sum and second convolution calculations have at least some cache hits when accessing the results stored in arrays B and D.

The first and second convolution calculations are computationally intensive, but the scalar sum calculation is data intensive, meaning that a large amount of memory bandwidth is required to perform the scalar sum calculation. While all three of the computations can be performed by host processors, such as GPUs, CPUs, etc., doing so is inefficient because of the high memory bandwidth required to perform the scalar sum calculation at the processor can become a bottleneck.

FIG. 2B depicts instructions for performing the same set of calculations as in FIG. 2A, except the scalar sum calculation has been offloaded to memory, i.e., the scalar sum calculation is performed by memory-side processing elements, such as PIM. Performing the scalar sum calculation in memory avails the computation of higher memory bandwidth that PIM can provide than is available to the processor when the scalar-sum calculation is performed by the processor, as in FIG. 2A. As previously mentioned, however, there are some disadvantages with offloading calculations to memory.

As depicted in FIG. 2B, the results of the first convolution calculation that are stored in array B must be flushed to memory so that they are available to the memory-side processing elements to perform the scalar sum calculation. In addition, presuming that a subset of array D is also in processor caches, array D must also be flushed to memory so that the host caches do not store stale data when array D is updated by memory-side processing elements, such as PIM. This leads to the significant disadvantage that the second convolution calculation is guaranteed to incur a cache miss on array D, since array D is stored in memory and not in any processor-side caches. More specifically, array D must be loaded from memory into processor-side caches for performing the second convolution calculation. This at least partially offsets the performance benefits provided by performing the scalar sum calculation in memory.

B. Using Read Hints to Preload Results of Memory-Side Processing

FIG. 2C depicts instructions for performing the same set of calculations as in FIG. 2B with the scalar sum calculation offloaded to memory, except a read hint is used to reduce cache misses incurred by offloading the scalar sum calculation to memory. According to an implementation, the instruction to offload the scalar sum calculation to memory, i.e., "PIM+: Scalar-sum (B+C→D)," includes a read hint that indicates that the results of the scalar sum calculation will be read by the host processor, e.g., to perform the second convolution calculation "Conv (D, w2→E)," where the "+" in the pseudo code indicates that the PIM instruction includes a read hint.

Read hints are invoked by any operation that indicates to a cache controller that the results of a calculation performed in memory will be read by a host processor. According to an implementation, a read hint is represented by one or more newly added bits, a previously unused bit value, a previously unused bit, or any combination of newly added bits and previously unused bit values and unused bits in the encoding of an operation. For example, it is not uncommon for command protocols to include extra or unused bits. A system with memory-side processing elements uses one of the previously extra or unused bits to specify a read hint. The particular unused bit values and/or bits used to indicate a read hint can be specified at processor design time, by preconfigured policies and/or runtime conditions.

According to an implementation, command processing logic in a processor-side cache controller is configured to examine memory-side processing commands in the memory pipeline to determine whether certain bit values indicate a read hint. For example, a cache controller determines that a PIM command includes a read hint by examination, applying a bit mask, etc. Once a cache controller determines that a memory-side processing command includes a read hint, the cache controller causes the results of the memory-side processing to be preloaded into one or more processor-side caches. In the general case, a last level cache controller detects the read hint and causes the results of the memory-side processing to be preloaded into the last level cache. Alternately, as described in more detail hereinafter, other cache controllers cause results of memory-side processing to be preloaded into other caches. Having a cache controller instead of a GPU or a CPU perform preloading of results of memory-side processing as described herein avoids increasing latency attributable to additional kernel launches in the GPU context and prefetches in the CPU context, and serialization of the preloading on the critical processor path.

According to an implementation, in the GPU context where a GPU is performing a computation subsequent to the memory-side computation, such as the second convolution calculation in FIG. 2C, a cache controller in the GPU causes the results of the memory-side processing to be preloaded into a GPU cache. For example, a cache controller in the GPU causes array D, or a portion thereof, to be loaded into a GPU cache. Assuming, for example, that the data in array D occupies 1000 cache blocks, a cache controller performs 1000 loads to read array D from the processing-enabled memory 120 into the GPU cache.

According to another implementation, in the CPU context where a processor or core is performing a computation subsequent to the memory-side processing computation, a processor-side cache controller preloads data from memory. In the prior example, the cache controller for the L3 cache preloads the 1000 values of array D from the processing-enabled memory 120 into the L3 cache. This makes the results of the memory-side processing that are stored in array D available in a processor-side cache for the second convolution computation. This provides the technical benefit of reducing the likelihood of cache misses, depending upon the size of the available cache, the size of array D, and the particular algorithms that are used to manage caches, without increasing core latency attributable to additional kernel launches in the GPU context and prefetches in the CPU context, or serialization of the preloading on the critical processor path, since a cache controller handles the preloading of the memory-side processing results. The approach can be implemented by any processor-side cache controller or a memory controller.

This approach provides fine-grained control to software developers and compilers to mark specific memory-side processing instructions with read hints to reduce cache misses normally associated with memory-side processing. There may be situations where such fine-grained control is not necessary, i.e., on an instruction-by-instruction basis. According to an implementation, a cache controller or a memory controller is programmed with one or more address ranges for which preloading of memory-side processing results is desired. The cache controller or memory controller preloads results of memory-side processing for addresses within the programmed one or more address ranges.

According to an implementation, the cache controller (or memory controller) performing the preloading of memory-side processing results enforces an ordering constraint to ensure that the preloading is performed after the memory-side processing results are complete. This can be accomplished using a variety of mechanisms. One such mechanism is the use of memory centric ordering primitives as described in U.S. patent application Ser. No. 16/808,346 entitled "Lightweight Memory Ordering Primitives," filed on Mar. 3, 2020, the entire contents of which is incorporated herein by reference in its entirety for all purposes. Using ordering primitives ensures that the preloading of any portion of array D occurs after the memory-side computation on that portion of array D has been completed and the results stored to memory.

According to an implementation, cache controllers store commands to perform preloading, such as prefetch commands, in queues to allow the cache controllers to manage issuance of the commands in a manner that reduces interference with other memory-side processing instructions or memory load/store operations. As one example, a cache controller issues prefetch commands from queues during idle periods, i.e., during periods of low data bus and/or command bus utilization to reduce interference with other memory-side processing or load/store instructions. Prefetch commands in queues can also be managed based upon priority and degree of confidence, as described in more detail hereinafter.

C. Refinements and Extensions

The approach described herein for reducing the undesirable side effects of offloading computations to memory using read hints includes various refinements and extensions that provide additional technical benefits.

1. Preloading to a Particular Target Cache

While in the general case previously described herein a last level cache controller causes the results of memory-side computations to be preloaded into a last level cache, implementations are not limited to this case. According to an implementation, results of memory-side computations are preloaded to any cache, including caches that do not directly correspond to the cache controller or memory controller performing the preloading.

In this implementation, the memory-side processing instruction specifies a target cache, i.e., a destination cache, where the results of the memory-side processing will be stored. For example, newly added bits, unused bit values and/or unused bits in a memory-side processing instruction are used to specify the destination cache for the results of the memory-side processing. In this example, the cache controller corresponding to the destination cache specified in the memory-side processing instruction performs the preloading. Bit values and/or bits specify, without limitation, a compute unit ID of a GPU, a core ID of a CPU, or a cache ID, etc. If the memory-side processing instruction specifies a compute unit ID of a GPU or a core ID of a CPU, then the corresponding cache controller causes the results of the memory-side processing to be preloaded into a private cache of the corresponding GPU or CPU, e.g., the L1 and/or L2 cache of Core 1 or Core 2 in FIG. 1. According to an implementation, a last level cache, such as the L3 cache in FIG. 1, is a default destination for the results of memory-side processing, unless a different destination is specified by the memory-side processing instruction. In this implementation, memory-side processing results are preloaded into the last level cache, regardless of which cache controller or memory controller performs the preloading.

This approach provides the additional technical benefit of preloading the results of memory-side processing to a location that will be the most beneficial to the consumer of the results. For example, suppose that in FIG. 2C the host instructions are performed by Core 1 in FIG. 1. The programmer specifies Core 1 as the destination for the results of the "PIM+: Scalar-sum (B+C→D)" instruction so that they are available in cache for the second convolution instruction. The results of this memory-side computation are then preloaded into the L1 and/or L2 cache for Core 1.

2. Selective Preloading of Memory-Side Computation Results

It is not uncommon for memory-side processing commands to be broadcast to multiple memory modules to process larger amounts of data in parallel. The result is that sometimes the results of memory-side processing span multiple cache blocks. Since not all of the cache blocks necessarily carry data that is needed in a subsequent processor-side computation, preloading all of the data can be inefficient and possibly increase cache misses. Additionally, the result of a memory-side computation may exceed the size of caches, making it wasteful to attempt to preload the entire output of a memory-side computation.

According to an implementation, a memory-side processing instruction specifies one or more portions of memory-side processing results to be preloaded. The portions of results are be specified by one or more address ranges, one or more bit values to which a bit mask is applied, or data that specifies a particular address or memory-side processing element, such as a bank ID in the context of PIM-enabled DRAM. For example, a memory side processing instruction includes one or more bit values that correspond to one or more portions of memory-side processing results to be preloaded. This approach provides the additional technical benefit of improved efficiency and reduced likelihood of cache misses by focusing the preloading on the most relevant memory-side processing results. It also reduces the number of prefetch instructions stored in the cache controller queues. Policies that specify data regions to be preloaded can be preconfigured at the memory controller, via the operating system, or via application instructions by a programmer on a per-application basis.

3. Priority and Degree of Confidence

As previously mentioned herein, a cache controller can issue prefetch commands from queues during periods of low data bus and/or command bus utilization to reduce interference with other memory-side processing instructions and other memory requests from the processor. According to an implementation, a cache controller manages prefetch commands in queues based upon priority and degree of confidence. With respect to priority, memory-side processing commands, for which preloading of the corresponding memory-side processing results is to be used, specify a priority via, for example, one or more newly added or previously unused bit values or bits. The cache controller uses the priority specified in the memory-side processing command to decide when to issue the corresponding prefetch commands relative to other commands, i.e., in which order to issue commands. For example, prefetch commands are issued after all commands having a higher priority have been processed.

"Degree of confidence" as used herein refers to the likelihood that the results of memory-side computations will be read by the same processor that issued the memory-side processing command. There may be situations where it is known, or with a very high level of confidence, that the same processor that issued the memory-side processing command will read the results of the memory-side processing. In this situation, the degree of confidence is high. In other situations, it may not be known with a high degree of confidence that the results of memory-side processing will be read by the same processor that issued the corresponding memory-side processing command. For example, the results of memory-side processing may be used in a subsequent calculation by a different CPU (or core) or GPU than the CPU or GPU that issued the memory-side processing command. In addition, in some cases, it may not be known what other computations may be executed by the same processor that issued the memory-side processing command prior to consuming the result of the memory-side computation, which can cause preloaded values to be evicted from caches before they are used. In these cases, the degree of confidence is low. As with priority, the degree of confidence can be specified in newly added bits or previously unused bit values and/or bits of a memory-side processing command.

According to an implementation, a cache controller uses the degree of confidence to decide whether to invoke preloading of memory-side processing results. For example, if the degree of confidence specified for a memory-side processing command satisfies a specified level, then preloading of the results of the memory-side processing command is enabled and the results are preloaded into a processor-side cache. On the other hand, if the degree of confidence does not satisfy the specified level, e.g., is less than the specified level, the preloading is only used if the memory system shows idleness above a threshold or preloading is not used at all for that memory-side processing command. The ability to specify a priority and/or a degree of confidence in a memory-side processing command provides additional flexibility to software developers to control how cache controllers manage the new prefetch instructions that are generated to perform the preloading.

4. Optional Preloading Based Upon Cache Thrashing

In some situations, cached data is evicted from cache before it is used, known as "cache thrashing," which can increase the number of cache misses and degrade performance. For example, a computing architecture implements a Least Recently Used (LRU) eviction policy that results in the LRU data in cache being evicted as additional data is brought into the cache. When the evicted data is eventually needed, it has to be reloaded from memory into cache, which adversely affects performance. This may also occur with memory-side processing results that have been preloaded into a cache using the approach described herein, i.e., cached memory-side processing results that were preloaded into cache using read hints are evicted from cache before they are used in a subsequent processor-side computation.

According to an implementation, this technical problem is addressed by a technical solution that uses a cache thrashing threshold to enable or disable preloading of memory-side processing results using read hints. In a simple case, a cache controller detects whether cache thrashing exists and if so, disables preloading of memory-side processing results to avoid evicting existing useful data from cache. Alternatively, a cache controller monitors the level of cache thrashing and enables or disables preloading of memory-side processing results based upon the level of cache thrashing compared to the cache thrashing threshold. For example, if the current level of cache thrashing satisfies the cache thrashing threshold, i.e., is equal to or less than the cache thrashing threshold, then the current level of cache thrashing is either non-existent or low enough to enable preloading of memory-side processing results. In this situation it is presumed that preloading memory-side processing results into cache will not cause existing useful data to be evicted from cache. On the other hand, if the current level of cache thrashing does not satisfy the cache thrashing threshold, i.e., is greater than the cache thrashing threshold, then the current level of cache thrashing is too high, and preloading of memory-side processing results is disabled to prevent existing useful data from being evicted from cache.

The current level of cache thrashing can be tracked by a counter that counts the number of cached data blocks that are evicted before being read by the processor. The counter counts evictions over a specified period of time and then be reset. Alternatively, the counter is incremented on evictions of data blocks that have not been used and decremented on preloaded data blocks that are used. The current count is compared to the cache thrashing threshold and if the counter is less than or equal to the cache thrashing threshold, then preloading of memory-side processing results is enabled. If the current count is greater than the cache thrashing threshold then preloading is disabled. The comparison of the current count to the cache thrashing threshold can be performed at specified times, periodically, or at specified events. The cache thrashing threshold and the criteria that determine when the cache thrashing check is performed can be preconfigured at the memory controller or via the operating system by a programmer on a per-application basis.

According to an implementation, an address-based approach is used to enable or disable preloading of memory-side processing results based upon a current level of cache thrashing. In this implementation, a cache controller monitors the level of cache thrashing by address, i.e., by tracking whether cached data for specified addresses or address ranges are being evicted before being used. The cache controller then enables or disables preloading of memory-side processing results for the specified addresses or address ranges based upon the threshold. The selective enabling or disabling of preloading memory-side processing results using read hints based upon cache thrashing levels provides the technical benefit of using preloading when it is useful and will not degrade system performance below acceptable levels and not using preloading when current cache thrashing is high and enabling preloading is not likely to be useful and/or likely to degrade system performance below acceptable levels.

5. Fine-Grained Read Hints and Last Stores Considerations

Figure 3:
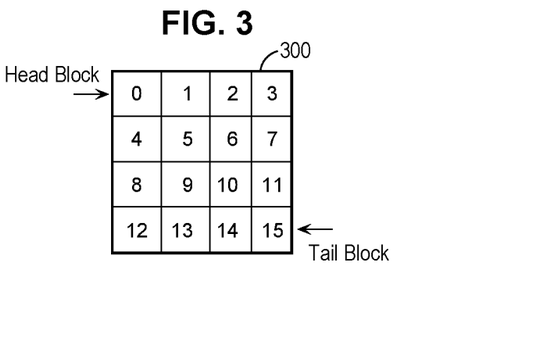
FIG. 3 depicts an example table of memory-side processing results.

There are situations where it is beneficial to selectively disable the use of read hints for particular portions of memory-side processing results. FIG. 3 depicts an example table 300 of memory-side processing results. In this example, the memory-side processing results represent the results of the memory-side scalar sum computation of FIG. 2C stored in array D and occupy 16 units of space, such as blocks. Suppose that in a particular implementation there is only sufficient available cache to store one of the 16 blocks. If all 16 blocks of memory-side processing results were successively preloaded into the cache, then after completion of the preload operations, only block 15 will be stored in the cache because starting with block 0, each successive block will have overwritten the prior block. If the second convolution operation starts with block 0 (head) and proceeds to block 15 (tail), then there will be cache misses for blocks 0 through 14, because only block 15 is stored in cache. In addition, the computational resources used for preloading blocks 0 through 14 are wasted.

According to an implementation, this technical problem is addressed by the ability for memory-side processing instructions to specify the last N number of blocks of memory-side processing results that are to be preloaded. In the present example, the memory-side scalar sum command of FIG. 2C specifies that the last block, i.e., block 15, of array D should be preloaded. The software developer or compiler, knowing the size of available cache and the size of memory-side processing results, specifies the last N number of blocks (or any other data unit) in the memory-side processing instruction. The last N number of blocks is specified, for example, by block ID or other information that identifies the portions of memory-side processing results that are to be preloaded. In addition, the software developer or compiler specifies that the next computation, e.g., the second convolution computation, is to be performed in reverse order, i.e., from block 15 (tail) to block 0 (head). This technical solution avoids wasting computational resources that are used to preload memory-side processing results that are evicted from cache before being used. The solution also increases the likelihood that cache hits will be realized for the memory-side processing results that are preloaded into cache. Although implementations are described in the context of preloading the last N number of portions of memory-side processing results, implementations are not limited to this example. A "most-often-used" data computation model can be used to identify portions of memory-side processing results that are most beneficial to preload for subsequent computations and then memory-side processing instructions are augmented with a read hint that specifies the identified portions of memory-side processing results. Referring again to FIG. 3, a memory-side processing command indicates that blocks 5-7 should be preloaded.

As previously described herein, cache or memory controllers can be programmed with one or more address ranges for which preloading of memory-side processing results is desired. The cache controller or memory controller preloads results of memory-side processing for addresses within the programmed one or more address ranges. In situations where multiple memory-side processing instructions will store processing results to the programmed address range, the cache or memory controller would not know when to preload data from the programmed address range. To address this issue, a software developer or a compiler specifies that preloading of cache results is to be used for the last memory-side processing instruction that stores memory-side processing results to the programmed address range.

The above-described refinements and extensions can be used individually or in any combination. For example, entire memory-side processing results can be preloaded to a default cache, such as a last level cache, or a particular target cache, and then managed by a cache controller using priority, degree of confidence, or both priority and degree of confidence. As another example, portions of memory-side processing results, as specified for example by address, last stores, etc., can be preloaded to a default cache, such as a last level cache, or a particular target cache and then managed by a cache controller using priority, degree of confidence, or both priority and degree of confidence.

Figure 4:
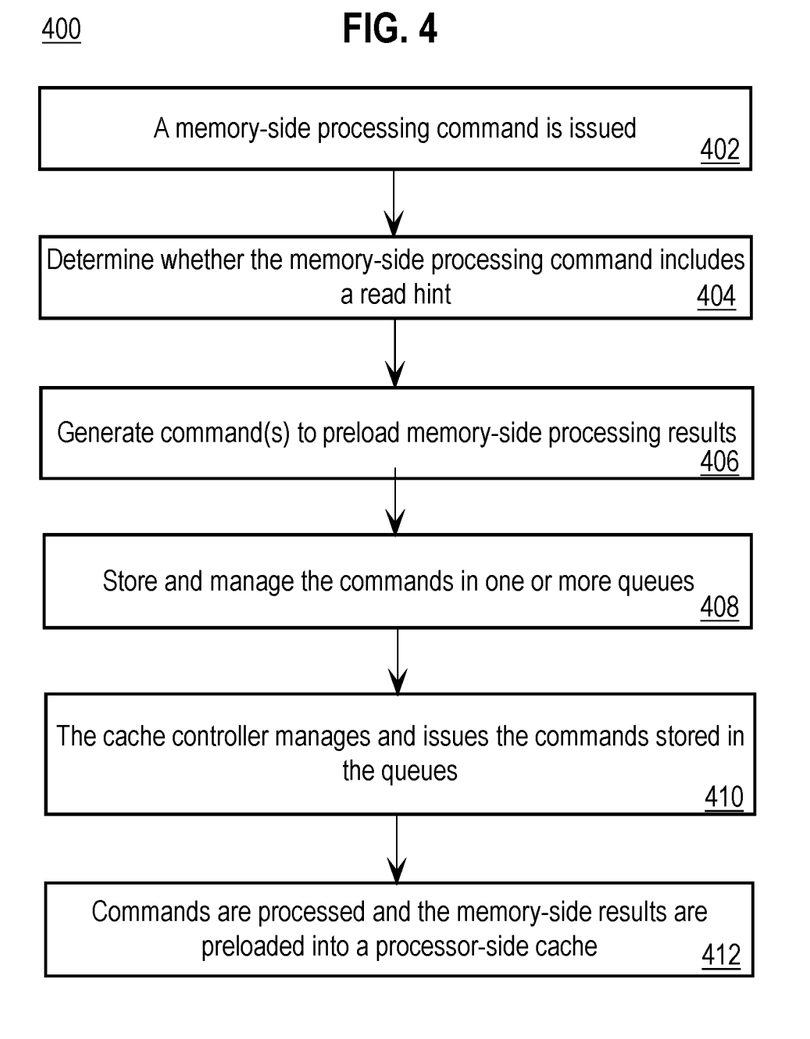
FIG. 4 is a flow diagram that depicts an approach for reducing side effects of memory-based processing using read hints.

FIG. 4 is a flow diagram 400 that depicts an approach for reducing side effects of memory-based processing using read hints. In this example, it is presumed that the optional preloading based upon cache thrashing is enabled, although it can be reevaluated at any time during this process.

In step 402, a memory-side processing command is issued. For example, processing of the "PIM+: Scalar-sum (B+C→D)" instruction of FIG. 2C causes a memory-side processing command to be issued into the memory pipeline and received by the cache controller for the L3 cache of FIG. 1.

In step 404, a determination is made whether the memory-side processing command includes a read hint. For example, a cache controller or a memory controller, such as the cache controller for the L3 cache, i.e., the last level cache controller, examines and/or applies a bit mask to one or more bits in the memory-side processing command and the result indicates whether the memory-side processing command includes a read hint. Alternatively, if the cache controller or a memory controller is programmed with one or more address ranges for which preloading of memory-side processing results is desired, then the cache controller or memory controller determines whether the memory-side processing command specifies an address within the programmed address range(s). For example, the L3 cache controller determines whether all or a subset of array D in the PIM command of FIG. 2C is within the preloads results of memory-side processing for addresses within the programmed one or more address ranges.

In step 406, one or more commands are generated to preload memory-side processing results. For example, a cache controller generates prefetch commands to load array D into the processor-side cache. The prefetch commands can specify a particular target cache for storing the memory-side processing results and/or can specify one or more portions of memory-side processing results.

In step 408, the commands are stored in one or more queues. Continuing the prior example, the cache controller that generated the 1000 prefetch commands stores them in one or more local queues managed by the cache controller.

In step 410, the cache controller manages and issues the commands stored in the queues. For example, the cache controller manages and issues the commands based upon priority, degree of confidence, or both priority and degree of confidence, as specified by the memory-side processing command. This is performed commensurate with enforcement of an ordering constraint to ensure that the memory-side computations are complete before the commands are issued to prefetch the memory-side processing results.

In step 412, the commands are processed, and the memory-side processing results are preloaded into a processor-side cache. For example, the prefetch commands are processed and the memory-side processing results, or a portion thereof, are loaded into a processor-side cache, such as a last level cache or a particular target cache specified in the memory-side processing command.

The approach described herein for using read hints to reduce the undesirable side effects of offloading computations to memory can be implemented by any cache controller and any number of cache controllers. For example, a last level cache controller is configured with the functionality to recognize read hints in memory-side processing commands and cause the results, or a portion thereof, of memory-side processing results to be preloaded into a cache, including a last level cache that corresponds to the last level cache controller, or other caches. Alternatively, one or more other cache controllers, or all cache controllers, are configured with the preloading functionality. In the case where multiple cache controllers are configured with the preloading functionality, conflicts and/or duplication is avoided by designating a particular destination cache in memory-side processing instructions so that only the corresponding cache controller will perform the prefetching. This provides a fine-grained capability for software developers and compilers to decide where and how preloading is implemented. For example, suppose that the cache controller for the L1 cache of Core 1 and the cache controller for the last level cache L3 are configured with the preloading functionality. If a memory-side processing instruction includes a read hint but does not specify a destination cache for the memory-side processing results, then the cache controller for the L1 cache of Core 1 does not perform preloading and instead the cache controller for the last level cache L3 performs the preloading. In this example, the last level cache controller is the default for performing preloading. If the memory-side processing instruction specifies the L1 cache of Core 1 or a core ID for Core 1, then the cache controller for the L1 cache of Core 1 performs the preloading and the cache controller for the last level cache L3 does not perform the preloading.

What is claimed is:

1. A cache controller
configured to cause, based at least upon application of a bit mask to a memory-side processing command, loading into a processor-side cache at least a portion of memory-side processing results of the memory-side processing command.

2. The cache controller of claim 1, wherein the cache controller is further configured to cause the at least a portion of the memory-side processing results to be loaded into a particular processor-side cache that is specified by the memory-side processing command.

3. The cache controller of claim 1, wherein:
the at least a portion of the memory-side processing results is a subset of the memory-side processing results, and
the subset of the memory-side processing results is specified by the memory-side processing command.

4. The cache controller of claim 3, wherein the memory-side processing command specifies the subset of the memory-side processing results by one or more of:
one or more addresses, a last N number of units of data, or data that identifies one or more memory-side processing units.

5. The cache controller of claim 1, wherein the cache controller is further configured to determine that at least the portion of the memory-side processing results will be read by a processor based upon at least the portion of the memory-side processing results being in an address range programmed in the cache controller and the memory-side processing command specifying that at least the portion of the memory-side processing results should be loaded into the processor-side cache.

6. The cache controller of claim 1, wherein the cache controller is further configured to:
generate and store one or more prefetch commands for loading the at least a portion of the memory-side processing results into the processor-side cache, and
issue the one or more prefetch commands during times of low data bus utilization or low command bus utilization.

7. The cache controller of claim 1, wherein the cache controller is further configured to:
  generate and store one or more prefetch commands for loading the at least a portion of the memory-side processing results into the processor-side cache, and
  issue the one or more prefetch commands based upon one or more of a priority or a degree of confidence specified by a memory-side processing command.

8. The cache controller of claim 1, wherein the cache controller is further configured to perform one or more of:
  detect whether cache thrashing currently exists and if cache thrashing does not currently exist, cause the at least a portion of the memory-side processing results to be loaded into the processor-side cache, or
  determine a current level of cache thrashing for the processor-side cache and cause the at least a portion of the memory-side processing results to be loaded into the processor-side cache in response to the current level of cache thrashing for the processor-side cache being below a cache thrashing threshold.

9. The cache controller of claim 1, wherein the cache controller is further configured to enforce an ordering constraint to ensure that the at least a portion of the memory-side processing results are loaded into the processor-side cache after the at least a portion of the memory-side processing results have been completed and stored to memory.

10. A memory controller
  configured to cause, based at least upon application of a bit mask to a memory-side processing command, loading into a processor-side cache at least a portion of memory-side processing results of the memory-side processing command.

11. The memory controller of claim 10, wherein the memory controller is further configured to cause the at least a portion of the memory-side processing results to be loaded into a particular processor-side cache that is specified by the memory-side processing command.

12. The memory controller of claim 10, wherein:
  the at least a portion of the memory-side processing results is a subset of the memory-side processing results, and
  the subset of the memory-side processing results is specified by the memory-side processing command.

13. The memory controller of claim 12, wherein the memory-side processing command specifies the subset of the memory-side processing results by one or more of:
  one or more addresses, a last N number of units of data, or data that identifies one or more memory-side processing units.

14. The memory controller of claim 10, wherein the memory controller is further configured to determine that at least the portion of the memory-side processing results will be read by a processor based upon at least the portion of the memory-side processing results being in an address range programmed in the memory controller and the memory-side processing command specifying that at least the portion of the memory-side processing results should be loaded into the processor-side cache.

15. The memory controller of claim 10, wherein the memory controller is further configured to:
  generate and store one or more prefetch commands for loading the at least a portion of the memory-side processing results into the processor-side cache, and
  issue the one or more prefetch commands during times of low data bus utilization or low command bus utilization.

16. The memory controller of claim 10, wherein the memory controller is further configured to:
  generate and store one or more prefetch commands for loading the at least a portion of the memory-side processing results into the processor-side cache, and
  issue the one or more prefetch commands based upon one or more of a priority or a degree of confidence specified by a memory-side processing command.

17. The memory controller of claim 10, wherein the memory controller is further configured to perform one or more of:
  detect whether cache thrashing currently exists and if cache thrashing does not currently exist, cause the at least a portion of the memory-side processing results to be loaded into the processor-side cache, or
  determine a current level of cache thrashing for the processor-side cache and cause the at least a portion of the memory-side processing results to be loaded into the processor-side cache in response to the current level of cache thrashing for the processor-side cache being below a cache thrashing threshold.

18. The memory controller of claim 10, wherein the memory controller is further configured to enforce an ordering constraint to ensure that the at least a portion of the memory-side processing results are loaded into the processor-side cache after the at least a portion of the memory-side processing results have been completed and stored to memory.

19. A method comprising:
  causing, by a cache controller, at least a portion of memory-side processing results to be loaded into a processor-side cache, based at least upon application of a bit mask to a memory-side processing command.

20. The method of claim 19, further comprising causing, by the cache controller, the at least a portion of the memory-side processing results to be loaded into a particular processor-side cache that is specified by the memory-side processing command.

* * * * *